(12) United States Patent
Jia (10) Patent No.: US 8,780,976 B1
(45) Date of Patent: Jul. 15, 2014

(54) METHOD AND APPARATUS FOR ENCODING VIDEO USING GRANULAR DOWNSAMPLING OF FRAME RESOLUTION

(75) Inventor: Wei Jia, San Jose, CA (US)

(73) Assignee: Google Inc., Mountain View, CA (US)

( * ) Notice: Subject to any disclaimer, the term of this patent is extended or adjusted under 35 U.S.C. 154(b) by 580 days.

(21) Appl. No.: 13/096,285

(22) Filed: Apr. 28, 2011

(51) Int. Cl.
*H04N 7/12* (2006.01)
*H04N 7/50* (2006.01)

(52) U.S. Cl.
CPC ..................... *H04N 7/50* (2013.01)
USPC ................................. 375/240.02

(58) Field of Classification Search
CPC ..................................... H04N 7/50
USPC ......................................... 375/240
See application file for complete search history.

(56) References Cited

U.S. PATENT DOCUMENTS

| | | | | |
|---|---|---|---|---|
| 5,262,855 A * | 11/1993 | Alattar et al. | ............ | 375/240.21 |
| 5,805,222 A * | 9/1998 | Nakagawa et al. | ...... | 375/240.12 |
| 7,313,283 B2 * | 12/2007 | Kondo et al. | ................. | 382/239 |
| 7,532,764 B2 * | 5/2009 | Lee et al. | ....................... | 382/238 |
| 7,876,820 B2 * | 1/2011 | Auwera et al. | ............ | 375/240.11 |
| 8,160,130 B2 * | 4/2012 | Ratakonda et al. | ...... | 375/240.01 |
| 8,385,422 B2 * | 2/2013 | Sato | ......................... | 375/240.16 |
| 2002/0003573 A1 * | 1/2002 | Yamaguchi et al. | .......... | 348/218 |
| 2005/0238243 A1 | 10/2005 | Kondo et al. | | |
| 2005/0276327 A1 * | 12/2005 | Lee et al. | ................. | 375/240.16 |
| 2006/0188014 A1 * | 8/2006 | Civanlar et al. | .......... | 375/240.03 |
| 2009/0219993 A1 | 9/2009 | Bronstein et al. | | |
| 2011/0026582 A1 * | 2/2011 | Bauza et al. | ............. | 375/240.02 |
| 2011/0026593 A1 * | 2/2011 | New et al. | ................. | 375/240.12 |
| 2011/0051955 A1 | 3/2011 | Cui et al. | | |
| 2011/0051995 A1 | 3/2011 | Guo et al. | | |
| 2012/0044383 A1 * | 2/2012 | Lee | .......................... | 348/231.99 |
| 2012/0275502 A1 * | 11/2012 | Hsieh et al. | .................... | 375/224 |
| 2012/0294355 A1 * | 11/2012 | Holcomb et al. | ......... | 375/240.03 |
| 2012/0294369 A1 * | 11/2012 | Bhagavathy et al. | .... | 375/240.16 |

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Techologies, Inc. Dated Mar. 28, 2005.

(Continued)

*Primary Examiner* — Joseph Ustaris
*Assistant Examiner* — Talha Nawaz
(74) *Attorney, Agent, or Firm* — Young Basile Hanlon & MacFarlane P.C.

(57) ABSTRACT

Disclosed herein are methods and apparatuses for encoding a video signal having a plurality of frames, each frame having a plurality of blocks and an original resolution. The method includes identifying a first frame from the plurality of frames that is predicted using inter prediction, determining a first variance for the first frame using a processor. selecting a first frame resolution from one of: (a) the original resolution or (b) a resolution lower than the original resolution for the first frame based on the first variance, and encoding the first frame using the selected first frame resolution.

20 Claims, 5 Drawing Sheets

(56) References Cited

OTHER PUBLICATIONS

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Unio. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.

\* cited by examiner

METHOD AND APPARATUS FOR ENCODING VIDEO USING GRANULAR DOWNSAMPLING OF FRAME RESOLUTION

TECHNICAL FIELD

The present invention relates in general to video signal transmission and particularly to the encoding and decoding of such a signal.

BACKGROUND

An increasing number of applications today make use of digital video signals for various purposes including, for example, business meetings between people in remote locations via video conferencing, high definition video entertainment, video advertisements, and sharing of user-generated videos. As technology is evolving, users have higher expectations for video quality and resolution even when video signals are transmitted over communications channels having limited bandwidth.

To permit transmission of digital video streams while limiting bandwidth consumption, a number of video compression schemes have been devised, including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes can use quantization techniques on frames of a digital video stream to reduce the bitrate (i.e. data size) of the encoded digital video stream. These quantization techniques discard part of a frame's data using standard computations, thereby reducing the frame's bitrate. Although these quantization techniques reduce the bitrate, they may not suitably maintain the quality of the video signal.

SUMMARY

Disclosed herein are embodiments of methods and apparatuses for encoding a video signal.

One aspect of the disclosed embodiments is a method for encoding a video signal having a plurality of frames, each frame having a plurality of blocks and an original resolution. The method includes identifying a first frame from the plurality of frames that is predicted using inter prediction, determining a first variance for the first frame using a processor, selecting a first frame resolution from one of: (a) the original resolution or (b) a resolution lower than the original resolution for the first frame based on the first variance, and encoding the first frame using the selected first frame resolution.

Another aspect of the disclosed embodiments is a method for determining at least one threshold used for encoding a video signal having a plurality of frames, each frame having a plurality of blocks. The method includes identifying a test sequence of frames, the frames in the test sequence of frames having an original resolution, calculating a variance for at least one frame in the test sequence, calculating a first PSNR for the at least one frame using the original resolution, calculating a second PSNR for the at least one frame using a lower resolution that is less than the original resolution, and determining the at least one threshold using the variances, first PSNRs, and second PSNRs.

Another aspect of the disclosed embodiments is an apparatus for encoding a video signal having at least one frame, each frame having a plurality of blocks, each block having a plurality of pixels. The apparatus comprises a memory and at least one processor configured to execute instructions stored in the memory to: identify a first frame from the plurality of frames that is predicted using inter prediction, determine a first variance for the first frame using a processor, select a first frame resolution from one of: (a) the original resolution or (b) a resolution lower than the original resolution for the first frame based on the first variance, encode the first frame using the selected first frame resolution.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

This Application hereby incorporates by reference in the entirety the following: co-pending U.S. patent application Ser. No. 13/095,967 filed on Apr. 28, 2011 and entitled "METHOD AND APPARATUS FOR ENCODING VIDEO BY DETERMINING BLOCK RESOLUTION", co-pending U.S. patent application Ser. No. 13/095,968 filed on Apr. 28, 2011 and entitled "METHOD AND APPARATUS FOR ENCODING VIDEO BY DOWNSAMPLING FRAME RESOLUTION".

Figure 1:
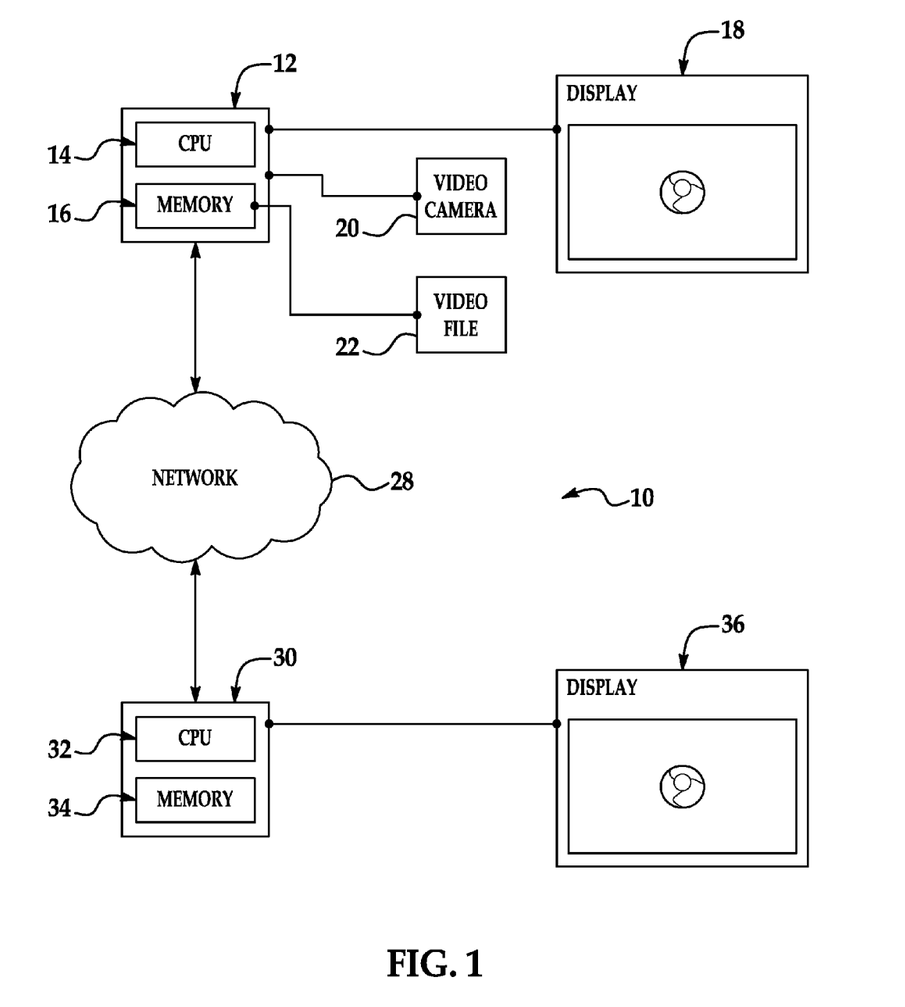
FIG. 1 is a schematic of a video encoding and decoding system.

FIG. 1 is a diagram of an encoder and decoder system 10 for still or dynamic video images. An exemplary transmitting station 12 may be, for example, a computer having an internal configuration of hardware including a processor such as a central processing unit (CPU) 14 and a memory 16. CPU 14 can be a controller for controlling the operations of transmitting station 12. The CPU 14 is connected to memory 16 by, for example, a memory bus. Memory 16 may be random access memory (RAM) or any other suitable memory device. Memory 16 can store data and program instructions which are used by the CPU 14. Other suitable implementations of transmitting station 12 are possible.

A display 18 configured to display a video stream can be connected to transmitting station 12. Display 18 may be implemented in various ways, including by a liquid crystal display (LCD) or a cathode-ray tube (CRT). Display 18 may also be configured for other uses, such as screencasting. Alternatively, or in addition to display 18, a video stream can be generated from a video camera 20 or a received from a video file 22 and can be transferred to transmitting station 12.

A video stream can consist of a number of adjacent video frames (i.e. images), which may be still or dynamic. Adjacent video frames can be further subdivided into a single frame. At the next level, the frame can be divided into a series of blocks, which contain data corresponding to, for example, a 16×16 block of displayed pixels. Each block can contain luminance and chrominance data for the corresponding pixels. The blocks can also be of any other suitable size such as 16×8 pixel groups or 8×16 pixel groups. In other embodiments, video stream may only include a single frame and may be in applications such as screencasting.

A network 28 connects transmitting station 12 and a receiving station 30 for encoding and decoding of the video stream. Specifically, the video stream can be encoded by an encoder in transmitting station 12 and the encoded video stream can be decoded by a decoder in receiving station 30. Network 28 may, for example, be the Internet. Network 28 may also be a local area network (LAN), wide area network (WAN), virtual private network (VPN), or any other means of transferring the video stream from transmitting station 12.

Receiving station 30, in one example, may be a computer having an internal configuration of hardware include a processor such as a central processing unit (CPU) 32 and a memory 34. CPU 32 is a controller for controlling the operations of transmitting station 12. CPU 32 can be connected to memory 34 by, for example, a memory bus. Memory 34 may be RAM or any other suitable memory device. Memory 34 stores data and program instructions which are used by CPU 32. Other suitable implementations of receiving station 30 are possible.

Figure 2:
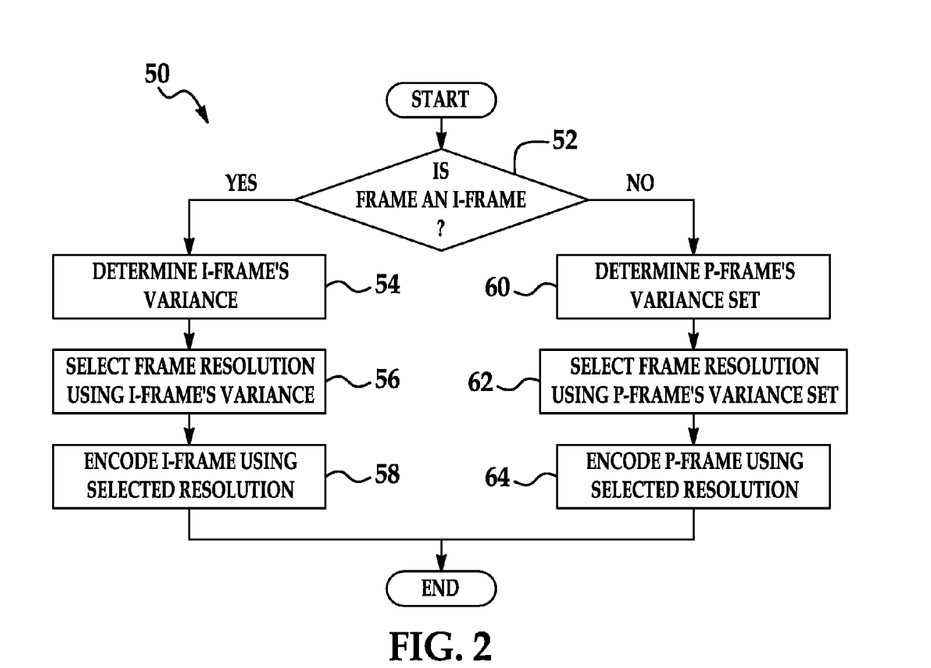
FIG. 2 is a flowchart diagram of an exemplary method of determining a resolution for a frame in the system of FIG. 1.

FIG. 2 is a flowchart of an exemplary method of determining resolution for a frame in the system of FIG. 1. The method 50 allows for the encoder to determine in a granular fashion the resolution to encode each frame in a video stream. For example, the encoder may encode a group of pictures (GOP) that contains frames encoded at different resolutions. To contrast, some current encoding schemes only provide the ability to encode frames at different resolutions in intervals based on GOP.

The encoder first determines whether the current frame is an intra predicted frame (I-frame) (52). The current frame may be an I-frame based on, for example, its position in the digital video stream. The current frame can be an I-frame based on a number of alternative considerations that may or may not be used by the encoder. For example, the current frame could be an I-frame if requested by the receiving station 24, or if the pre-determined resolution is set. However, some encoding schemes may require that a GOP be of a fixed length. In these encoding schemes, the I-frame determination would be based on a number of frames since the last I-frame.

If the current frame is an I-frame, the encoder determines the intra prediction frame variance of the current frame (54). A method of determining an intra prediction frame variance is described in more detail later with respect to FIG. 3. Next, the encoder selects the frame resolution for encoding the current frame based on the variance of the current frame (56). A method of selecting the frame resolution for an intra predicted frame is described in more detail later with respect to FIG. 4.

Once the frame resolution of the current frame is selected, the I-frame is encoded using the selected frame resolution (58). The encoding process can be performed using various encoding schemes, including variations of various current video encoding schemes presently available. The encoding process may be performed in parallel to the remainder of method 50. For example, the encoding of stage 60 may be performed on one processor in a computer, whereas the other stages of method 50 may be performed on another processor. Such a scheme would allow for the encoding of a first frame while another instance of method 50 determines the resolution of a next frame. In other words, the processing of one instance of method 50 would transfer to another processor at stage 60, while the processing of a new instance of method 50 begins on the one processor. Once the current frame is encoded, the method 50 ends.

Returning to stage 52, if the current frame is not an I-frame (i.e. it is to be encoded using inter prediction as a P-frame), the encoder determines the inter prediction frame variance of the current frame (60). A method of determining a inter prediction frame variance is described in more detail later with respect to FIG. 5. Next, the encoder selects the resolution of the current frame based on the variance of the current frame (62). A method of selecting the frame resolution of an inter predicted frame is described in more detail later with respect to FIG. 6.

Once the resolution of the current frame is selected, the encoder encodes the current frame using the selected frame resolution (64). As described previously with respect to stage 58, the encoding of the current frame in stage 64 may be performed on one processor in a computer, whereas the other stages of method 50 may be performed on another processor. Such a scheme would allow for the encoding of a first frame while method 50 determines the resolution of a next frame. Once the current frame is encoded, the method 50 ends.

Figure 3:
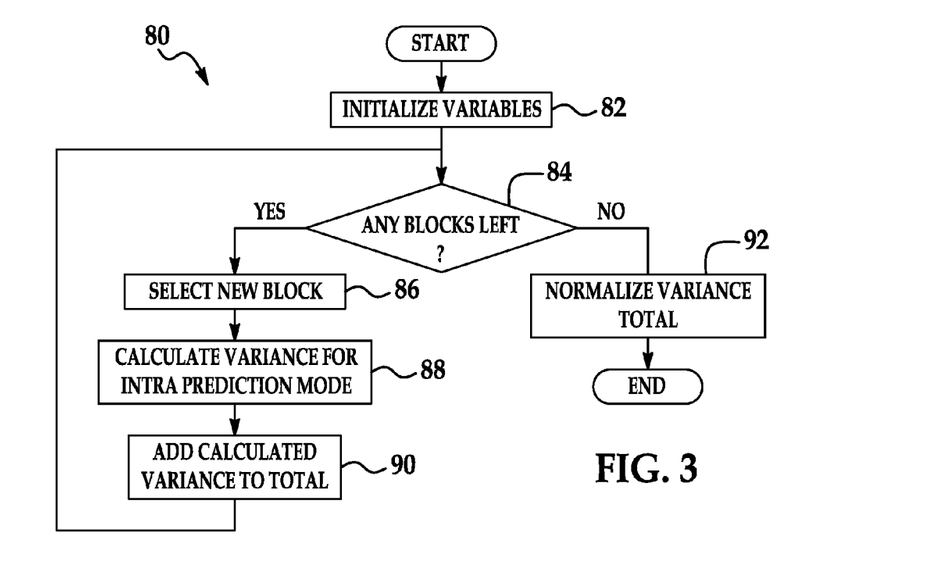
FIG. 3 is a flowchart diagram of an exemplary method of determining a variance for a frame predicted by intra prediction usable in the method of FIG. 2.

FIG. 3 is a flowchart diagram of an exemplary method 80 of determining a variance for a frame predicted by intra prediction usable in the method 50 of FIG. 2. The encoder first can initialize any variables needed to determine the I-frame variance (82). Variables can include, for example, those for an intra-prediction variance and an intra-prediction variance total. Next, the encoder determines if there are any blocks left to process in the current frame (84). If so, the encoder selects the next block in the current frame (86). Blocks can be selected in any order, including raster order. The encoder then calculates the intra-prediction variance for the selected block (88).

The intra-prediction variance can be calculated by performing intra prediction on the blocks in the current frame. Intra prediction can be based on previously coded image samples within the current frame. Intra prediction can be performed on a current block by, for example, copying pixels (or filtered pixels) from adjacent, previously coded blocks to form a predicted block. The manner in which the pixels are copied can be by vertical prediction, horizontal prediction, DC prediction, True Motion prediction, southwest prediction, southeast prediction, vertical right diagonal prediction, vertical left diagonal prediction, horizontal down prediction, horizontal up prediction, etc.

Intra prediction can also be performed using a technique other than copying pixel values. For example, a predicted block can be formed for a current block using one or more parameterized equations. These parameterized equations can be, for example, an expression representing a curve that has a "best fit" to a defined set of previously coded pixels in the frame. Other techniques of determining a predicted block using intra prediction are also possible.

A residual block is determined based on the difference between the predicted block and the best-matching block. The intra-prediction variance can then be calculated using the below equations:

$$\text{mean} = \frac{\sum_{i=0} \sum_{j=0} p_{i,j}}{N}; \text{ wherein} \qquad (1)$$

i is a x-coordinate within the residual block;
j is a y-coordinate within the residual block;
$p_{i,j}$ is a value of a pixel located at the coordinates of i, j within the residual block; and
N is a number of pixels within the residual block. In addition, $$\text{intra} - \text{prediction variance} = \frac{\sum_{i=0} \sum_{j=0} |p_{i,j} - \text{mean}|}{N} \qquad (2)$$

The mean for the residual block is first calculated by averaging the values of all pixels within the residual block. The intra-prediction variance is then calculated by averaging the absolute value of the difference of each pixel from the mean of the residual block. The calculations above are exemplary only, and other similar means of determining the intra-prediction variance may be utilized.

The encoder next adds the calculated intra-prediction variance for the selected block to the intra-prediction variance total for the current frame (90). The encoder then returns to determine whether additional blocks are available within the current frame (stage 84). Once there are no blocks left to process, the encoder then normalizes the intra-prediction variance total (92). Normalization is used to equalize the scale of the intra-prediction variance total with the intra threshold that it will be later compared with. For example, the intra threshold may be of a per-block scale. In such a case, the intra-prediction variance total would be normalized by dividing it by the number of blocks in the current frame, and that result would be used as the frame's variance. In another example, the intra threshold may be of a per-frame scale. In such a case, the intra-prediction variance total would be normalized by leaving the intra-predicting variance total as-is and using it directly as the frame's variance.

Figure 4:
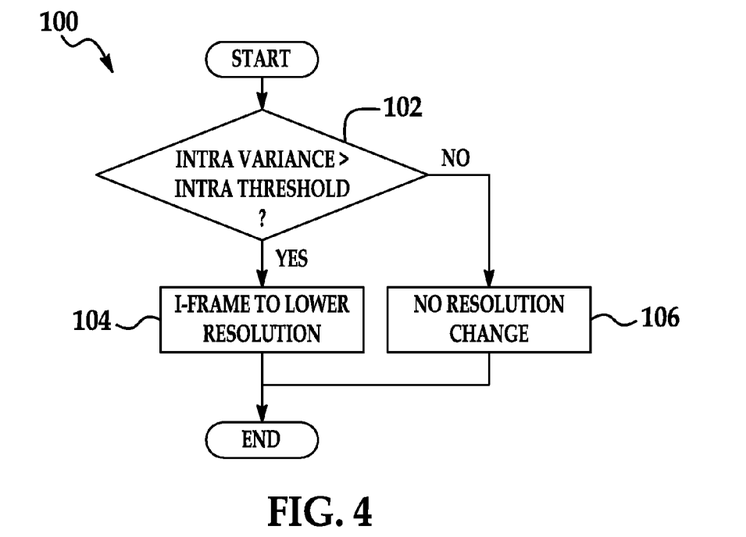
FIG. 4 is a flowchart diagram of an exemplary method of determining a resolution for a frame predicted by intra prediction usable in the method of FIG. 2.

FIG. 4 is a flowchart diagram of an exemplary method 100 of determining a resolution for a frame predicted by intra prediction usable in the method 50 of FIG. 2. The encoder will determine whether the current frame's intra-prediction variance (its variance) is greater than an intra threshold (102). The intra threshold is a pre-determined value than can be calculated using the method described later with respect to FIG. 7. If the variance is greater than the threshold, the current frame (I-frame) is encoded at a resolution less than the original resolution (104). Otherwise, no change is made to the current frame's resolution (106). In other words, the frame is encoded at its original resolution.

Figure 5:
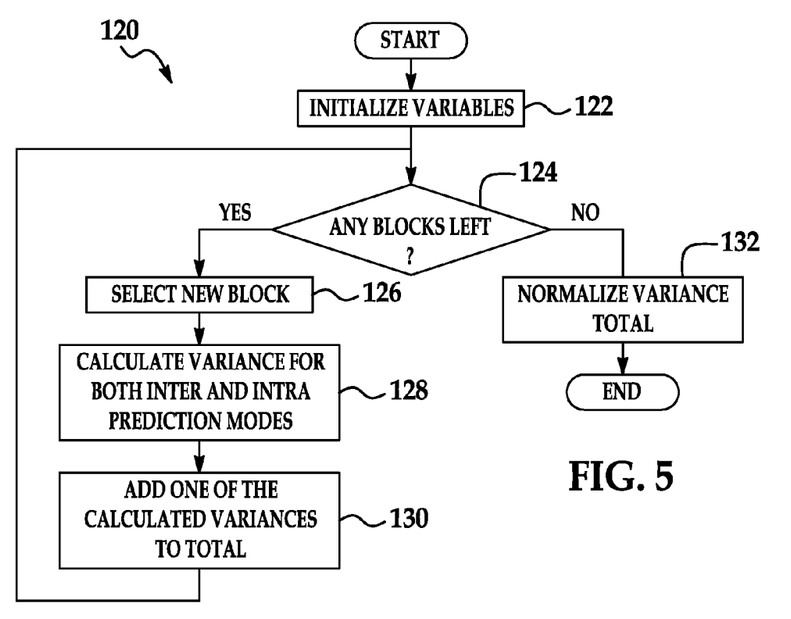
FIG. 5 is a flowchart diagram of an exemplary method of determining a variance for a frame predicted by inter prediction usable in the method of FIG. 2.

FIG. 5 is a flowchart diagram of an exemplary method 120 of determining a variance for a frame predicted by inter prediction usable in the method 50 of FIG. 2. The encoder first can initialize any variables needed to determine the P-frame variance (122). Variables can include, for example, those for an inter-prediction variance, intra-prediction variance, and a variance total. Next, the encoder determines if there are any blocks left to process in the current frame (124). If so, the encoder selects the next block in the current frame (126). Blocks can be selected in any order, including raster order. The encoder then calculates the intra-prediction variance and the inter-prediction variance for the selected block (128).

As described before, the intra-prediction variance can be calculated by copying pixel values from previously coded blocks, using a parameterized equation or any other possible technique. A residual block is determined based on the difference between the predicted block and the best-matching block. The intra-prediction variance can then be calculated using equations (1) and (2) above or by an equivalent set of calculations.

The inter-prediction variance can be calculated by first performing an inter-frame motion vector search for a best-matching block in a reference frame. The reference frame can be any reference frame available in the encoding scheme used, including, for example, a last frame, a last I-frame, or an alternative reference frame. A residual block is determined based on the difference between the current block and the best-matching block. A motion vector is also encoded that describes the position of the best-matching block relative to the position of the current block. The inter-prediction variance can then be calculated using equations (1) and (2) above or by an equivalent set of calculations.

The encoder next adds one of the calculated inter-prediction variance or the intra-prediction variance to the variance total (130). In one embodiment, the inter-prediction variance is added to the variance total. In another embodiment, the variance added to the variance total is based on which variance is the smallest variance. The choice between the smallest of the inter-prediction variance and the intra-prediction variance can be done because an inter-predicted frame may contain blocks that are both inter predicted and intra predicted. In this case, the encoder may take this into account by using the intra-prediction variance if it finds a better matching block than can be found using inter prediction.

The encoder then returns to determine whether additional blocks are available within the current frame (stage 124). Once there are no blocks left to process, the encoder then normalizes the variance total (122). The normalization process can be the same or similar process as described previously with respect to stage 92. The normalized variance total is the inter variance of the current frame.

Figure 6:
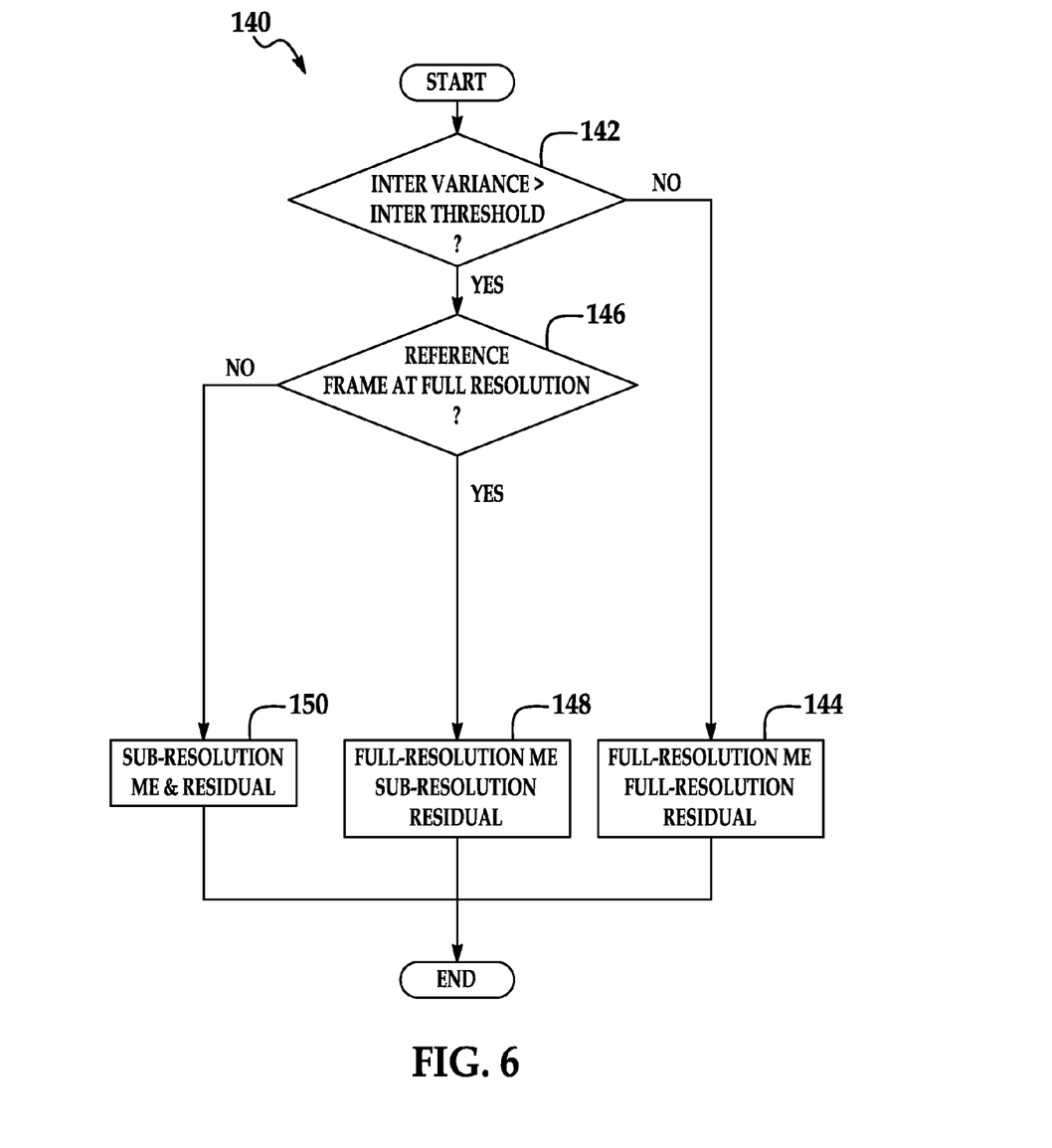
FIG. 6 is a flowchart diagram of an exemplary method of determining a resolution for a frame predicted by inter prediction usable in the method of FIG. 2.

FIG. 6 is a flowchart diagram of an exemplary method 140 of determining a resolution for a frame predicted by inter prediction usable in the method 50 of FIG. 2. The encoder will determine whether the current frame's inter variance is greater than an inter threshold (142). The inter threshold is a pre-determined value than can be calculated using the method described later with respect to FIG. 7.

If the variance is not greater than the threshold, the encoder will perform inter prediction using a reference frame at the original frame resolution and will create a residual frame at the original resolution (144). If necessary, the reference frame will be up-sampled to the original resolution. In other words, if the reference frame of the current frame is encoded at a resolution less than the original resolution, reference frame will be up-sampled to the original resolution before inter-prediction is performed.

Returning to stage 142, f the inter variance is greater than the inter threshold, the encoder checks the resolution of the reference frame (146). If the reference frame is at the original resolution, then the inter prediction will be performed at the original resolution, and the resulting residual will be down-sampled to a resolution less than the original resolution for encoding (148). Otherwise, if the reference frame is at a resolution less than the original resolution, then the inter prediction will be performed at that lower resolution, and the resulting residual will be encoded at that lower resolution (150). In other words, the inter prediction will be performed at the reference frame resolution, and the residual output will be adjusted to a different resolution if necessary.

Figure 7:
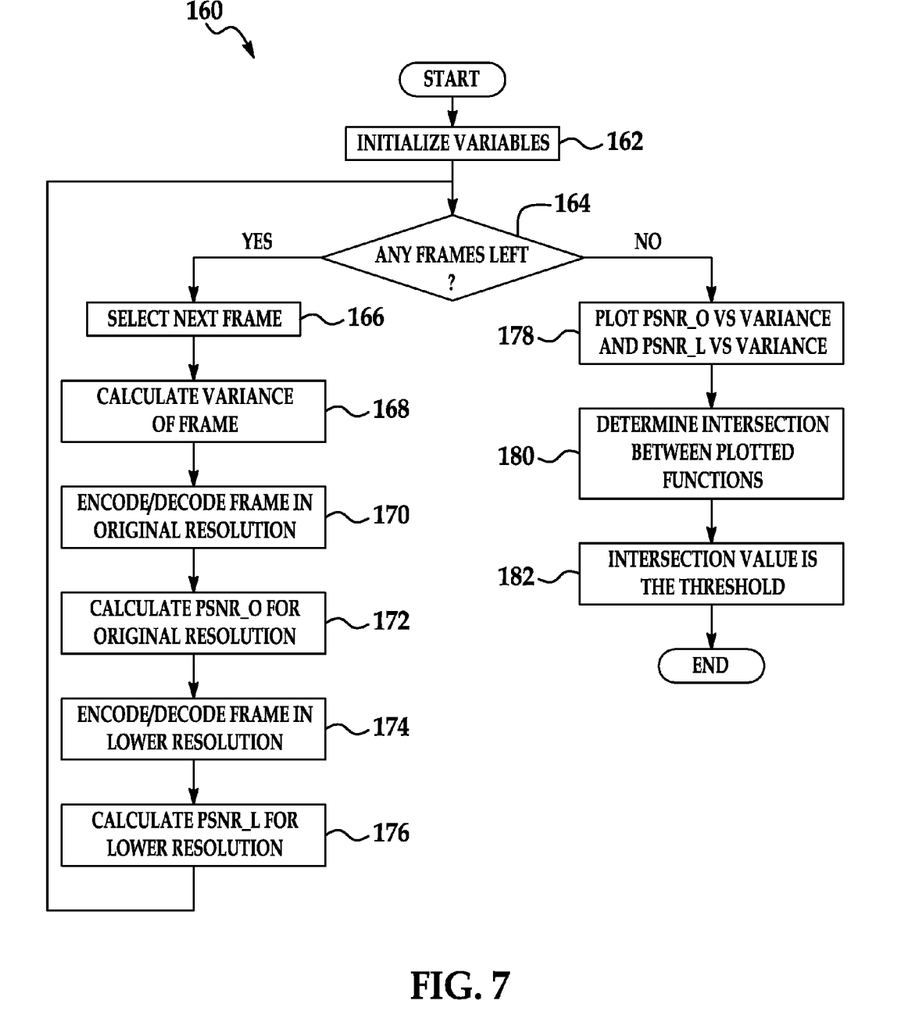
FIG. 7 is a flowchart diagram of an exemplary method of determining a threshold value usable in the method of FIG. 2.

FIG. 7 is a flowchart diagram of an exemplary method 160 of determining a threshold value usable in the method 50 of FIG. 2. The method 160 is capable of determining either an intra threshold or an inter threshold. Each of the intra and inter thresholds can be a pre-determined value that are each determined by method 160 and then included in the encoder. To determine a threshold using method 160, first, any variables needed to determine the threshold can be initialized (102). Such variables can include, for example, one or more arrays for PSNR_O, PSNR_L, and frame variance, which will be discussed in more detail below.

The method 160 operates on a test sequence of frames. The test sequence of frames can contain video data similar to that expected to be encoded. For example, in a screen casting encoding application, the test sequence of frames could be an exemplary screen casting video data stream. In another example, if an encoder could be used for screen casting and for encoding of moving pictures (i.e. video clips and/or movies), the test sequence of frames can include both a screen casting video data stream and a moving picture video data stream. The test sequence of frame can also be based on video data from other sources.

Once variables are initialized, the method 160 next includes checks to see if any frames are left to process in the test sequence of frames (164). If there is at least one frame left, the next frame for processing is selected (166). The variance of the selected frame is calculated using a method such as method 80 of determining an intra frame variance or method 120 of determining an inter frame variance (168). The selected frame is encoded and then decoded using its original resolution (170). The encoding is performed to create an encoded frame that is within a target bitrate. If the threshold being calculated is the inter threshold, the encoding is performed using inter prediction, whereas if the threshold is the intra threshold, the encoding is performed using intra prediction.

An original resolution peak signal-to-noise-ratio (PSNR_O) will be calculated using the frame and the decoded frame (172). A PSNR value is a measure of quality comparing the original frame and a lossy-encoded reconstructed (decoded) frame. In this case, the PSNR_O measures the quality of the resulting decoded frame after being compressed to the target bitrate using techniques other than the changing of pixel resolution (i.e. quantization).

The PSNR can be calculated using a mean squared error (MSE). The PSNR alternatively can be calculated using other means. One exemplary equation for calculating the MSE and PSNR is provided:

$$MSE = \frac{1}{mn} \sum_{i=0}^{m-1} \sum_{j=0}^{n-1} [S(i,j) - D(i,j)]^2; \text{ wherein} \quad (3)$$

i is a x-coordinate;

j is a y-coordinate;

S is the selected frame;

D is the decoded frame;

m is the width of the frames S and D;

n is the height of the frames S and D.

D is the decoded frame. In addition, $$PSNR = 10\log_{10}\left(\frac{MAX_S^2}{MSE}\right); \text{ wherein} \quad (4)$$

$MAX_S$ is the maximum possible pixel value of the selected frame.

Once the PSNR_O has been calculated, the selected frame will be downsampled to a resolution less than the original resolution, the downsampled frame will be encoded, the encoded downsampled frame will then be decoded, and the decoded downsampled frame will then be upsampled to the original resolution (174). As with the encoding of the original resolution frame, the encoding of the downsampled frame is performed using the target bitrate. Also, if the threshold being calculated is the inter threshold, the encoding is performed using inter prediction, whereas if the threshold is the intra threshold, the encoding is performed using intra prediction. The purpose is to create a decoded upsampled frame for comparison with the selected frame. The resolution of the downsampled frame can be determined using one or more pre-determined lower resolutions. Alternatively, the resolution of the downsampled frame can be determined on a frame-by-frame basis, selected by a user or any other technique.

A lower resolution peak signal-to-noise-ratio (PSNR_L) is then calculated (176). In this case, the PSNR_L measures the quality of the resulting decoded upsampled frame after being compressed to the target bitrate using the technique of changing the pixel resolution.

Once the variance, PSNR_O, and PSNR_L have been calculated for the selected frame, the method 160 returns to stage 164 to determine if any additional frames are available in the test sequence of frames. Once there are no frames left, the method 160 includes plotting the variance, PSNR_O, and PSNR_L values calculated for each frame (178). The plot includes two series of data. The first series includes the variance for each frame versus the PSNR_O value for each frame. The second series includes the variance for each frame versus the PSNR_L value for each frame.

The first and second series can be plotted using fitted curve techniques. For example, an approximate fitted curve function can be determined to approximate each series. The fitted curve techniques used can include techniques such as the least squares method. Alternatively, the first and second series can be plotted using their actual values. Plotting may not involve the actual placement of data points on a coordinate plane. Rather, plotting may merely be an intermediate step performed by a processor.

Next, an intersection between the first series and the second series is determined (180). The intersection may be determined computationally by a processor based on the fitted curves determined for each series. But the intersection can also be determined using other methods. For example, a programmer or other person may select the intersection based on a plot of each series on a coordinate plane. The selected intersection is the threshold (182). Alternatively, the selected intersection's value may be multiplied by a constant or processed by a standard function to normalize it for use in the encoder as the threshold.

The operation of encoding or decoding can be performed in many different ways and can produce a variety of encoded data formats. The above-described embodiments of encoding or decoding may illustrate some exemplary encoding techniques. However, in general, encoding and decoding are understood to include any transformation or other change of data whatsoever.

The embodiments of transmitting station 12 and/or receiving station 30 (and the algorithms, methods, instructions etc. stored thereon and/or executed thereby) can be realized in hardware, software, or any combination thereof including, for example, IP cores, ASICS, programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of transmitting station 12 and receiving station 30 do not necessarily have to be implemented in the same manner.

Further, in one embodiment, for example, transmitting station 12 or receiving station 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 30 can, for example, be implemented on computers in a screencasting system. Alternatively, transmitting station 12 can be implemented on a server and receiving station 30 can be implemented on a device separate from the server, such as a handheld communications device (i.e. a cell phone). In this instance, transmitting station 12 can encode content using an encoder into an encoded video signal and transmit the encoded video signal to the communications device. In turn, the communications device can then decode the encoded video signal using a decoder. Alternatively, the communications device can decode content stored locally on the communications device (i.e. no transmission is necessary). Other suitable transmitting station 12 and receiving station 30 implementation schemes are available. For example, receiving station 30 can be a personal computer rather than a portable communications device.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal having a plurality of frames, each frame having a plurality of blocks and an original resolution, the method comprising:
   identifying a first frame from the plurality of frames that is predicted using inter prediction;
   determining a first variance for the first frame using a processor;
   calculating a first peak signal to noise ratio (PSNR) for the at least one frame using the original resolution; and
   calculating a second PSNR for the at least one frame using a resolution lower than the original resolution for the first frame;
   selecting a first frame resolution from one of: (a) the original resolution or (b) the resolution lower than the original resolution for the first frame based on the first variance, the first PSNR, and the second PSNR: and
   encoding the first frame using the selected first frame resolution.

2. The method of claim 1, wherein the resolution lower than the original resolution is a pre-determined resolution.

3. The method of claim 1, wherein determining the first variance comprises:
   calculating an inter-prediction variance for at least some of the blocks in the first frame;
   calculating an inter-prediction variance total; and
   normalizing the inter-prediction variance total.

4. The method of claim 3, wherein the inter-prediction variance can be one of an inter-prediction variance or an intra-prediction variance.

5. The method of claim 1, wherein selecting the first frame resolution comprises:
   determining that the first variance exceeds an inter threshold; and
   selecting the first frame resolution for the first frame as a resolution less than the original resolution.

6. The method of claim 5, wherein encoding the first frame using the first frame resolution comprises:
   performing inter prediction using a reference frame having a reference frame resolution;
   creating a residual frame at the reference frame resolution using the reference frame and the first frame; and
   encoding the residual frame.

7. The method of claim 6, wherein creating the residual frame comprises:
   resampling the residual frame to the first frame resolution if the reference frame resolution is different than the first frame resolution.

8. The method of claim 1, wherein selecting the first frame resolution comprises:
   determining that the first variance does not exceed an inter threshold; and
   selecting the original resolution as the first frame resolution.

9. The method of claim 8, wherein encoding the first frame using the first frame resolution comprises:
   identifying a reference frame having a reference frame resolution;
   resampling the reference frame to the original resolution if the reference frame resolution is less than the original resolution;
   performing inter prediction using the reference frame at the original resolution;
   creating a residual frame at the original resolution using the reference frame and the first frame; and
   encoding the residual frame.

10. The method of claim 1, further comprising:
   identifying a second frame from the plurality of frames that is predicted using intra prediction;
   determining a second variance for the second frame;
   selecting a second frame resolution from one of: (a) the original resolution or (b) a resolution lower than the original resolution for the second frame based on the second variance; and
   encoding the second frame using the selected second frame resolution.

11. The method of claim 10, wherein determining the second variance comprises:
calculating an intra-prediction variance for at least some of the blocks in the second frame;
calculating an intra-prediction variance total; and
normalizing the intra-prediction variance total.

12. The method of claim 11, wherein selecting the second frame resolution comprises:
if the second variance exceeds an intra threshold, selecting the second frame resolution for the first frame as a resolution lower than the original resolution.

13. The method of claim 1, wherein calculating the first PSNR for the at least one frame includes selecting a frame from the plurality of frames, encoding the selected frame, decoding the encoded frame, and calculating the first PSNR using the selected frame and the decoded frame, and further wherein the calculating the second PSNR for the at least one frame comprises selecting a frame from the plurality of frames, determining a downsampled frame at the lower resolution from the selected frame, encoding the downsampled frame, decoding the encoded downsampled frame, determining a decoded upsampled frame at the original resolution using the decoded downsampled frame, and calculating the second PSNR using the selected frame and the decoded upsampled frame.

14. An apparatus for encoding a video signal having a plurality of frames having a plurality of blocks and an original resolution, the apparatus comprising:
a memory; and
at least one processor configured to execute instructions stored in the memory to:
identify a first frame from the plurality of frames that is predicted using inter prediction;
determine a first variance for the first frame using a processor;
calculate a first peak signal to noise ratio (PSNR) for the at least one frame using the original resolution; and
calculate a second PSNR for the at least one frame using a resolution lower than the original resolution for the first frame;
select a first frame resolution from one of: (a) the original resolution or (b) the resolution lower than the original resolution for the first frame based on the first variance, the first PSNR, and the second PSNR: and
encode the first frame using the selected first frame resolution.

15. The apparatus of claim 14, wherein the at least one processor comprises a first processor and a second processor, each processor configured to execute at least some of the instructions stored in the memory.

16. The apparatus of claim 14, wherein the at least one processor is further configured to execute instructions stored in the memory to:
calculate an inter-prediction variance for at least some of the blocks in the first frame;
calculate an inter-prediction variance total; and
normalize the inter-prediction variance total.

17. The apparatus of claim 14, wherein the at least one processor is further configured to execute instructions stored in the memory to:
determine that the first variance exceeds an inter threshold; and
select the first frame resolution for the first frame as a resolution less than the original resolution.

18. A non-transitory computer-readable storage device including program instructions executable by one or more processors that, when executed, cause the one or more processors to perform operations for encoding a video having a plurality of frames, each frame having a plurality of blocks and an original resolution, the operations comprising:
identifying a first frame from the plurality of frames that is predicted using inter prediction;
determining a first variance for the first frame using a processor;
calculating a first peak signal to noise ratio (PSNRI for the at least one frame using the original resolution; and
calculating a second PSNR for the at least one frame using a resolution lower than the original resolution for the first frame;
selecting a first frame resolution from one of: (a) the original resolution or (b) the resolution lower than the original resolution for the first frame based on the first variance, the first PSNR, and the second PSNR: and
encoding the first frame using the selected first frame resolution.

19. The non-transitory computer-readable storage device of claim 18, the operations further comprising:
calculating an inter-prediction variance for at least some of the blocks in the first frame;
calculating an inter-prediction variance total; and
normalizing the inter-prediction variance total.

20. The non-transitory computer-readable storage device of claim 18, the operations further comprising:
determining that the first variance exceeds an inter threshold; and
selecting the first frame resolution for the first frame as a resolution less than the original resolution.

* * * * *

UNITED STATES PATENT AND TRADEMARK OFFICE
CERTIFICATE OF CORRECTION

| | | |
|---|---|---|
| PATENT NO. | : 8,780,976 B1 | Page 1 of 1 |
| APPLICATION NO. | : 13/096285 | |
| DATED | : July 15, 2014 | |
| INVENTOR(S) | : Wei Jia | |

It is certified that error appears in the above-identified patent and that said Letters Patent is hereby corrected as shown below:

On the Title Page, Item (56), Column 2, Line 22, "Techologies" should be "Technologies"

On Title Page 2, Item (56), Column 2, Line 4, "Unio" should be "Union"

In the Claims

Column 12, Claim 18, Line 25, "(PSNRI" should be "(PSNR)"

Signed and Sealed this
Seventh Day of October, 2014

Michelle K. Lee
*Deputy Director of the United States Patent and Trademark Office*